(12) United States Patent
Granger et al.

(10) Patent No.: US 11,987,021 B2
(45) Date of Patent: May 21, 2024

(54) MULTILAYER RIBLET APPLIQUES

(71) Applicant: The Boeing Company, Chicago, IL (US)

(72) Inventors: George Michael Granger, Redmond, WA (US); Mitchell Nakaki, Los Angeles, CA (US); Maribel G. Locsin, Seattle, WA (US); Denise A. Blohowiak, Issaquah, WA (US); Kelcey D. Sterling, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/463,778

(22) Filed: Sep. 1, 2021

(65) Prior Publication Data

US 2023/0063783 A1    Mar. 2, 2023

(51) Int. Cl.
*B32B 25/20*    (2006.01)
*B32B 3/30*    (2006.01)
*B32B 7/12*    (2006.01)
*B32B 25/08*    (2006.01)
*B64C 21/10*    (2006.01)

(52) U.S. Cl.
CPC ............... *B32B 25/20* (2013.01); *B32B 3/30* (2013.01); *B32B 7/12* (2013.01); *B32B 25/08* (2013.01); *B64C 21/10* (2013.01); *B32B 2605/18* (2013.01)

(58) Field of Classification Search
CPC . B64C 2230/14; B64C 2230/26; B64C 21/10; F15D 1/12; F15D 1/004; F15D 1/002; B32B 3/30; B32B 7/12; B32B 25/08; B32B 25/20
See application file for complete search history.

(56) References Cited

U.S. PATENT DOCUMENTS

| 4,093,487 | A | 6/1978 | Gaworoski et al. |
| 4,650,138 | A | 3/1987 | Grose |
| 4,706,910 | A | 11/1987 | Walsh et al. |
| 4,736,912 | A | 4/1988 | Loebert |
| 4,865,271 | A | 9/1989 | Savill |
| 4,897,146 | A | 1/1990 | Inzinna |
| 4,930,729 | A | 6/1990 | Savill |

(Continued)

FOREIGN PATENT DOCUMENTS

| CN | 103039138 | 4/2013 |
| EP | 2070688 | 6/2009 |

(Continued)

OTHER PUBLICATIONS

Canadian Intellectual Property Office, "Office Action," issued in connection with Canadian Patent Application No. 2,967,682, dated Dec. 3, 2020, 3 pages.

(Continued)

*Primary Examiner* — Catherine A. Simone
(74) *Attorney, Agent, or Firm* — HANLEY, FLIGHT & ZIMMERMAN, LLC

(57) ABSTRACT

Multilayer riblet appliques are disclosed. An example riblet applique includes a fluorosilicone riblet structure including riblet ridges and a base from which the riblet ridges extend, and a support layer proximate the fluorosilicone riblet structure. The support layer includes a vacuum-plasma-treated polymer film having a first surface and a second surface opposite the first surface, and a polymer sub-layer proximate the second surface of the polymer film.

22 Claims, 5 Drawing Sheets

(56) References Cited

U.S. PATENT DOCUMENTS

| | | |
|---|---|---|
| 4,932,612 A | 6/1990 | Blackwelder et al. |
| 4,994,053 A | 2/1991 | Lang |
| 5,054,412 A | 10/1991 | Reed et al. |
| 5,069,403 A | 12/1991 | Marentic et al. |
| 5,133,516 A | 7/1992 | Marentic et al. |
| 5,133,519 A | 7/1992 | Falco |
| 5,445,095 A | 8/1995 | Reed et al. |
| 5,456,785 A | 10/1995 | Venable |
| 5,505,543 A | 4/1996 | Webbeking et al. |
| 5,520,717 A | 5/1996 | Miller et al. |
| 5,637,873 A | 6/1997 | Davis et al. |
| 5,766,306 A | 6/1998 | Olli et al. |
| 5,766,764 A | 6/1998 | Olli et al. |
| 5,860,626 A | 1/1999 | Moser |
| 5,874,167 A | 2/1999 | Rawlings et al. |
| 5,971,326 A | 10/1999 | Bechert |
| 6,177,189 B1 | 1/2001 | Rawlings et al. |
| 6,191,248 B1 | 2/2001 | Rawlings et al. |
| 6,345,791 B1 | 2/2002 | McClure |
| 6,376,063 B1 | 4/2002 | Rasmussen et al. |
| 6,475,616 B1 | 11/2002 | Dietz et al. |
| 6,524,675 B1 | 2/2003 | Mikami et al. |
| 6,699,579 B2 | 3/2004 | Rasmussen et al. |
| 6,958,207 B1 | 10/2005 | Khusnatdinov et al. |
| 6,982,794 B1 | 1/2006 | Davis et al. |
| 6,994,045 B2 | 2/2006 | Paszkowski |
| 7,041,363 B2 | 5/2006 | Krohmer et al. |
| 7,044,073 B2 | 5/2006 | Goldstein |
| 7,052,586 B2 | 5/2006 | Rasmussen et al. |
| 7,070,850 B2 | 7/2006 | Dietz et al. |
| 7,221,513 B2 | 5/2007 | Cho et al. |
| 7,224,529 B2 | 5/2007 | King et al. |
| 7,298,554 B2 | 11/2007 | Cho et al. |
| 7,417,798 B2 | 8/2008 | King et al. |
| 7,444,932 B2 | 11/2008 | Strand et al. |
| 7,445,409 B2 | 11/2008 | Trice et al. |
| 7,525,785 B2 | 4/2009 | Rawlings |
| 7,544,407 B1 | 6/2009 | Rawlings et al. |
| 7,678,997 B2 | 3/2010 | Rawlings |
| 7,703,179 B2 | 4/2010 | Ferguson et al. |
| 7,755,670 B2 | 7/2010 | Utagawa |
| 7,757,591 B2 | 7/2010 | Trice et al. |
| 7,807,229 B2 | 10/2010 | Rawlings et al. |
| 7,864,501 B2 | 1/2011 | Rawlings et al. |
| 7,867,621 B2 | 1/2011 | Rawlings et al. |
| 7,931,841 B2 | 4/2011 | Huizinga et al. |
| 7,940,462 B2 | 5/2011 | Noguchi et al. |
| 8,038,102 B2 | 10/2011 | Miller et al. |
| 8,113,469 B2 | 2/2012 | Lang |
| 8,220,754 B2 | 7/2012 | McClure et al. |
| 8,286,909 B2 | 10/2012 | Lee |
| 8,292,226 B2 | 10/2012 | Sankrithi et al. |
| 8,343,298 B2 | 1/2013 | Rawlings et al. |
| 8,413,928 B2 | 4/2013 | Rawlings et al. |
| 8,444,092 B2 | 5/2013 | Li et al. |
| 8,460,779 B2 | 6/2013 | Gupta et al. |
| 8,578,747 B2 | 11/2013 | Li et al. |
| 8,668,166 B2 | 3/2014 | Rawlings et al. |
| 8,678,316 B2 | 3/2014 | Rawlings et al. |
| 8,684,310 B2 | 4/2014 | Rawlings et al. |
| 8,687,342 B2 | 4/2014 | Rawlings et al. |
| 8,715,824 B2 | 5/2014 | Rawlings et al. |
| 8,733,702 B1 | 5/2014 | Rawlings et al. |
| 8,794,574 B2 | 8/2014 | Lang |
| 8,870,124 B2 | 10/2014 | Ireland |
| 8,876,052 B2 | 11/2014 | Rawlings et al. |
| 9,017,797 B2 | 4/2015 | Goelling |
| 9,272,791 B2 | 3/2016 | Brennan et al. |
| 9,297,394 B2 | 3/2016 | Li et al. |
| 9,352,533 B2 | 5/2016 | Rawlings et al. |
| 9,371,141 B2 | 6/2016 | Rawlings et al. |
| 9,714,083 B2 | 7/2017 | Rawlings |
| 9,751,618 B2 | 9/2017 | Rawlings et al. |
| 9,868,135 B2 | 1/2018 | Williams et al. |
| 10,105,877 B2 | 10/2018 | Rawlings et al. |
| 10,946,559 B2 | 3/2021 | Rawlings et al. |
| 2002/0082542 A1 | 6/2002 | Hall |
| 2003/0133121 A1 | 7/2003 | Davis et al. |
| 2004/0028907 A1 | 2/2004 | Wang |
| 2004/0126541 A1 | 7/2004 | Dietz et al. |
| 2004/0200932 A1 | 10/2004 | Scott et al. |
| 2005/0094277 A1 | 5/2005 | Khusnatdinov et al. |
| 2005/0181203 A1 | 8/2005 | Rawlings et al. |
| 2006/0051592 A1 | 3/2006 | Rawlings et al. |
| 2006/0060722 A1 | 3/2006 | Choi et al. |
| 2007/0060026 A1 | 3/2007 | Sung |
| 2007/0194178 A1 | 8/2007 | Lang |
| 2007/0257400 A1 | 11/2007 | Stenzel et al. |
| 2008/0061192 A1 | 3/2008 | Sullivan |
| 2008/0233356 A1 | 9/2008 | Loher et al. |
| 2010/0080958 A1 | 4/2010 | Goelling |
| 2010/0108813 A1 | 5/2010 | Lang |
| 2010/0127125 A1 | 5/2010 | Li et al. |
| 2010/0187359 A1 | 7/2010 | Rawlings et al. |
| 2010/0187360 A1 | 7/2010 | Rawlings et al. |
| 2010/0187361 A1 | 7/2010 | Rawlings et al. |
| 2010/0282909 A1 | 11/2010 | Rawlings et al. |
| 2010/0308177 A1 | 12/2010 | McClure et al. |
| 2011/0006165 A1 | 1/2011 | Ireland |
| 2011/0008174 A1 | 1/2011 | Ireland |
| 2011/0073710 A1 | 3/2011 | Rawlings et al. |
| 2011/0186685 A1 | 8/2011 | Tsotsis et al. |
| 2011/0262705 A1 | 10/2011 | Gupta et al. |
| 2011/0274875 A1 | 11/2011 | Lang |
| 2012/0025025 A1 | 2/2012 | Brennan et al. |
| 2012/0227453 A1 | 9/2012 | Li et al. |
| 2013/0028744 A1 | 1/2013 | Nordin et al. |
| 2013/0062004 A1 | 3/2013 | Amirehteshami et al. |
| 2013/0107278 A1 | 5/2013 | Meyer et al. |
| 2013/0193270 A1 | 8/2013 | Rawlings et al. |
| 2013/0257055 A1 | 10/2013 | Simpson |
| 2014/0023837 A1 | 1/2014 | Miller et al. |
| 2014/0099475 A1 | 4/2014 | Rawlings et al. |
| 2014/0110263 A1 | 4/2014 | Barbier et al. |
| 2014/0116597 A1 | 5/2014 | Miller et al. |
| 2014/0130318 A1 | 5/2014 | Rohr et al. |
| 2014/0174642 A1 | 6/2014 | Rawlings et al. |
| 2014/0238646 A1 | 8/2014 | Enright |
| 2014/0242285 A1 | 8/2014 | Pettersson et al. |
| 2014/0248453 A1 | 9/2014 | Li et al. |
| 2014/0248469 A1 | 9/2014 | Rawlings et al. |
| 2014/0255632 A1 | 9/2014 | Gradert et al. |
| 2014/0272237 A1 | 9/2014 | Roper et al. |
| 2014/0295143 A1 | 10/2014 | Rawlings et al. |
| 2014/0332631 A1 | 11/2014 | Rawlings et al. |
| 2014/0356219 A1 | 12/2014 | Gammel et al. |
| 2014/0363637 A1 | 12/2014 | Kovach et al. |
| 2015/0017385 A1 | 1/2015 | Lang |
| 2015/0037542 A1 | 2/2015 | Nadella et al. |
| 2015/0053289 A1 | 2/2015 | Kurtovic et al. |
| 2015/0136909 A1 | 5/2015 | Kruckenberg et al. |
| 2016/0107371 A1 | 4/2016 | Hurme et al. |
| 2016/0159466 A1 | 6/2016 | Daggett et al. |
| 2016/0168685 A1 | 6/2016 | Surply et al. |
| 2016/0243586 A1 | 8/2016 | Travis |
| 2016/0271930 A1 | 9/2016 | Roper et al. |
| 2016/0325818 A1 | 11/2016 | Williams et al. |
| 2016/0325823 A1 | 11/2016 | Rawlings et al. |
| 2016/0325824 A1 | 11/2016 | Rawlings |
| 2018/0009136 A1 | 1/2018 | Rawlings et al. |

FOREIGN PATENT DOCUMENTS

| | | |
|---|---|---|
| EP | 3266581 A1 | 1/2018 |
| WO | 03000483 | 1/2003 |
| WO | 2005038862 | 4/2005 |

(56) References Cited

FOREIGN PATENT DOCUMENTS

| WO | 2011037719 | 3/2011 |
|----|------------|--------|
| WO | 2012082667 | 6/2012 |

OTHER PUBLICATIONS

Canadian Intellectual Property Office, "Examination Report," issued in Canadian Patent Application No. 2,967,682, dated Jul. 3, 2020, 4 pages.

Chinese Patent Office, "Notification of the First Office Action," issued in connection with Chinese Patent Application No. 2017105527113, dated Jul. 10, 2020, 18 pages.

United States Patent and Trademark Office, "Notice of Allowance and Fee(s) Due," issued in connection With U.S. Appl. No. 14/705,569, dated Sep. 28, 2017, 4 pages.

European Patent Office, "European Search Report," issued in connection with European Application No. 16162961.3, dated Sep. 13, 2016, 9 pages.

United States Patent and Trademark Office, "Final Office action," issued in connection with U.S. Appl. No. 14/705,569, dated Oct. 14, 2016, 12 pages.

European Patent Office, "European Search Report," issued in connection with European Application No. 16167099.7, dated Nov. 11, 2016, 8 pages.

European Patent Office, "European Search Report," issued in connection with European Application No. 16167118.5, dated Nov. 11, 2016, 8 pages.

United States Patent and Trademark Office, "Non-final Office action," issued in connection with U.S. Appl. No. 14/705,547, dated Nov. 3, 2016, 13 pages.

Casey et al., "Embossing of Nanoscale Features and Environments," Microelectronic Engineering, 35 (1997) pp. 693-366, 4 pages.

United States Patent and Trademark Office, "Non-final Office action," issued in connection with U.S. Appl. No. 14/705,569, dated Feb. 1, 2017, 10 pages.

United States Patent and Trademark Office, "Non-final Office action," issued in connection with U.S. Appl. No. 14/705,569, dated Jun. 21, 2016, 11 pages.

United States Patent and Trademark Office, "Non-final Office action," issued in connection with U.S. Appl. No. 14/705,564, dated Aug. 10, 2016, 10 pages.

United States Patent and Trademark Office, "Notice of Allowance and Fee(s) Due," issued in connection with U.S. Appl. No. 15/205,460, dated Jun. 28, 2018, 9 pages.

United States Patent and Trademark Office, "Restriction Requirement," issued in connection with U.S. Appl. No. 15/205,460, dated Aug. 31, 2017, 10 pages.

European Patent Office, "European Search Report," issued in connection with European Application No. 17180327.3, dated Dec. 6, 2017, 10 pages.

United States Patent and Trademark Office, "Final Office action," issued in connection with U.S. Appl. No. 14/705,569, dated May 19, 2017, 10 pages.

United States Patent and Trademark Office, "Non-final Office action," issued in connection with U.S. Appl. No. 14/705,569, dated Feb. 1, 2017, 11 pages.

United States Patent and Trademark Office, "Notice of Allowance and Fee(s) Due," issued in connection with U.S. Appl. No. 14/705,547, dated May 8, 2017, 8 pages.

United States Patent and Trademark Office, "Notice of Allowance and Fee(s) Due," issued in connection with U.S. Appl. No. 14/705,564, dated Mar. 1, 2017, 5 pages.

United States Patent and Trademark Office, "Non-Final Office action," issued in connection with U.S. Appl. No. 15/205,460, dated Dec. 29, 2017, 9 pages.

United States Patent and Trademark Office, "Non-Final Office Action," issued in connection with U.S. Appl. No. 16/148,760, dated Nov. 18, 2019, 7 pages.

United States Patent and Trademark Office, "Final Office Action," issued in connection with U.S. Appl. No. 16/148,760, dated Jun. 4, 2020, 8 pages.

United States Patent and Trademark Office, "Notice of Allowance," issued in connection with U.S. Appl. No. 16/148,760, dated Oct. 7, 2020, 7 pages.

United States Patent and Trademark Office, "Supplemental Notice of Allowance," issued in connection with U.S. Appl. No. 16/148,760, dated Feb. 8, 2021, 2 pages.

European Patent Office, "Extended European Search Report," issued in connection with European Application No. 22179577.6, dated Nov. 28, 2022, 7 pages.

MULTILAYER RIBLET APPLIQUES

FIELD OF THE DISCLOSURE

This disclosure relates generally to appliques and, more particularly, to multilayer riblet appliques.

BACKGROUND

Microstructures such as riblets are typically used on an aircraft to alter flight characteristics and/or dynamics of the aircraft. In particular, the riblets are used on surfaces of a wing, a fin or a fuselage of the aircraft to reduce drag and/or a drag coefficient of the aircraft, which can result in overall fuel savings and/or reduction in carbon-dioxide emissions, etc. Riblets may also be used to provide traction (e.g., for stepping, etc.) for personnel (e.g., maintenance personnel).

The riblets can have a multilayered construction and are typically attached to aircraft surfaces using an adhesive (e.g., adhered or applied as an applique). In particular, the riblets are multilayered for different functions including aesthetics, grounding and geometric/physical requirements (e.g., flow altering capabilities and/or durability). In known examples, it is important for riblets with a layered construction to have reliable and consistent bonding and/or curing between layers because the riblets can be exposed to high loads, as well as relatively harsh environmental conditions, associated with flight.

Known riblet appliques sometimes include a layer of aluminum foil, which can limit or prevent UV from reaching inner layers of a riblet that are below the foil. However, incorporating foil in the riblet applique can be difficult, time consuming, and expensive. For instance, processing of the foil to obtain adequate adhesion can be expensive and require processing with a significant time. There is, therefore, a desire for a riblet applique that provides UV protection without an aluminum foil layer.

SUMMARY

An example riblet applique includes a fluorosilicone riblet structure including riblet ridges and a base from which the riblet ridges extend, and a support layer proximate the fluorosilicone riblet structure. The support layer includes a vacuum-plasma-treated polymer film having a first surface and a second surface opposite the first surface, and a polymer sub-layer proximate the second surface of the polymer film.

An example support layer for use with a riblet applique includes a vacuum-plasma-treated polymer film having a first surface and a second surface opposite the first surface, the first surface to be coupled to a riblet structure including riblet ridges and a base from which the riblet ridges extend, and a polymer sub-layer proximate the second surface of the polymer film, the polymer sub-layer to be coupled to an adhesive for coupling the riblet applique to an external surface of a vehicle.

An example method of producing a riblet applique includes aligning a fluorosilicone riblet structure to a support layer, the fluorosilicone riblet structure including riblet ridges and a base from which the riblet ridges extend. The support layer includes a vacuum-plasma-treated polymer film having a first surface and a second surface opposite the first surface, and a polymer sub-layer proximate the second surface of the polymer film. The method further includes coupling the fluorosilicone riblet structure to the support layer at the first surface.

Figure 1:
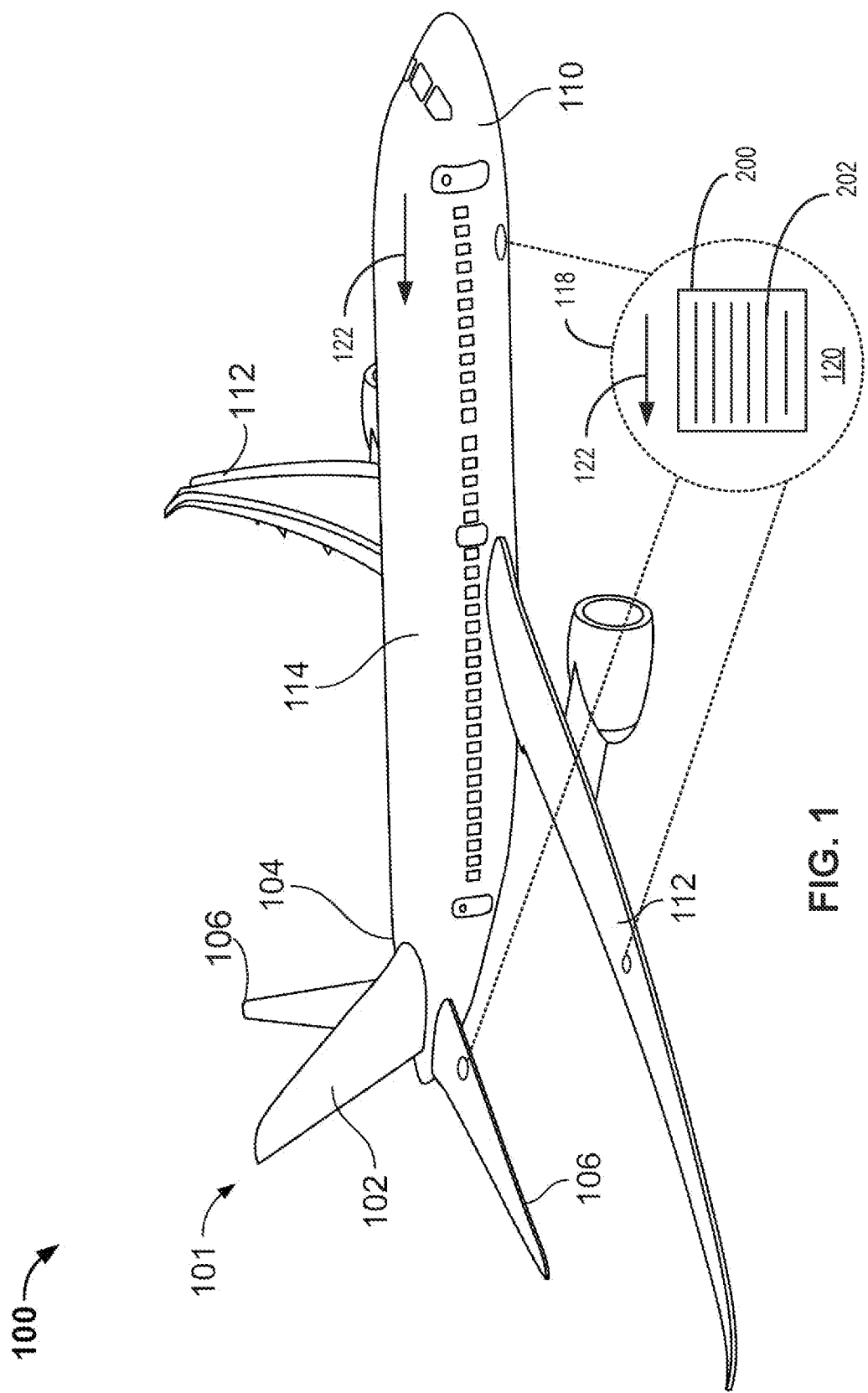
FIG. 1 illustrates an example aircraft that may be used to implement the example methods and apparatus disclosed herein.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part is between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Multilayer riblet appliques are disclosed herein. Microstructures such as riblets, for example, are typically used on aerodynamic surfaces of an aircraft to alter and/or improve flight characteristics to reduce an overall drag of the aircraft and, thus, may result in in overall fuel savings and/or reduction in carbon-dioxide emissions, etc. In particular, the riblets are used on surfaces of a wing, a fin or a fuselage of the aircraft to reduce drag and/or a drag coefficient of the aircraft, which can result in overall fuel savings and/or reduction in carbon-dioxide emissions, etc. These riblets, for example, can have a multilayered construction and are typically attached to aircraft surfaces using an adhesive (e.g., as a multilayered applique). The riblets are multilayered for different functions including aesthetics, grounding and/or geometric/physical requirements (e.g., flow altering capabilities and/or durability) and can be subject to significant loading (e.g., wind loads, etc.) during flight, for example. Thus, effective interlayer bonding and/or assembly of this multilayered construction can greatly reduce and/or prevent delamination of the riblet itself or separation of the riblet from an aircraft surface (e.g., a surface of an aircraft fuselage) due to significant loads encountered during flight, for example.

Example disclosed herein enable cost-effective multilayered riblet applique structures (e.g., multilayered riblet structures) that are resistant to delamination and/or separation of layers. In particular, examples disclosed herein are related to layering constructions that very effectively bind together layers of riblet applique structures, thereby enabling a relatively long service life thereof. Further, examples disclosed herein are highly resistant to ultraviolet (UV) damage and, thus, can last with a relatively significant amount of UV exposure.

According to examples disclosed herein, a riblet applique includes a fluorosilicone riblet structure having riblet ridges and a base from which the riblet ridges extend, and a support layer proximate or adjacent the fluorosilicone riblet structure. In turn, the support layer includes a vacuum-plasma-treated polymer film with a first surface and a second surface opposite the first surface (e.g., the first and second surfaces of the plasma-treated polymer film are diametrically opposed at different thicknesses of the polymer film). The support layer also includes a polymer sub-layer proximate or adjacent the second surface of the polymer film. As a result, examples disclosed herein are cost-effective while enabling significant resistance to damage (e.g., delamination) and/or long-term degradation.

In some examples, the riblet elastomer is directly cast onto a carrier film that is pre-embossed with the negative shape of the desired riblet geometry; then while still uncured, the fluorosilicone is laminated to the first surface of the polymer film alone or as the upper surface of the multilayer applique base. In some examples, the carrier film is retained as a protective masking layer through subsequent fabrication of the full riblet applique and during application onto the aircraft. In some examples, the embossed carrier film is created from polymers exhibiting ready release after installation, such as polyethylene or fluoropolymers, for example. In some examples, the first surface of the support polymer film includes a riblet elastomer adhesion promoter to facilitate bonding of the polymer film to the riblet elastomer. In some examples, adhesion-promoting treatments include vacuum plasma, as well as chemical or coating treatments. In some examples, the fluorosilicone riblet structure includes a UV stable polymer support film, such as polyethylene terephthalate formulated for UV stability, for example. Additionally, in some examples, an aliphatic urethane adhesive is implemented between the second surface of the vacuum-plasma-treated polymer film and the polymer sub-layer, and is cured after coupling the vacuum-plasma-treated polymer film and the polymer sub-layer.

As used herein, the terms "riblet," "riblet construction" or "riblet structure" may refer to geometric features, dimensions and/or distances between geometric features (e.g., periodic distances, heights and/or widths, etc.) that define, form, couple and/or support riblets. Therefore, the terms "riblet," "riblet construction" or "riblet structure" may refer to any of a riblet layer, a riblet assembly and/or a multilayered riblet construction, etc.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface of the aircraft 100.

As can be seen in the illustrated example, a detail 118 shows a riblet applique 200 with ridges 202. In this example, the riblet applique 200 is placed on an aerodynamic surface 120. Additionally or alternatively, the riblet applique 200 can be placed on any of the wings 112, the stabilizers 106, the fuselage 114 or any other appropriate position of the aircraft 100. Arrows 122 generally indicate a direction of airflow over the aircraft 100 during flight of the aircraft 100. In this example, the ridges 202 and/or the riblet applique 200 are generally aligned with the direction of the airflow, thereby enabling a relatively laminar airflow surround the aircraft 100 which, in turn, can reduce an overall drag coefficient of the aircraft 100 and, thus, fuel consumption of the aircraft 100.

Figure 2:
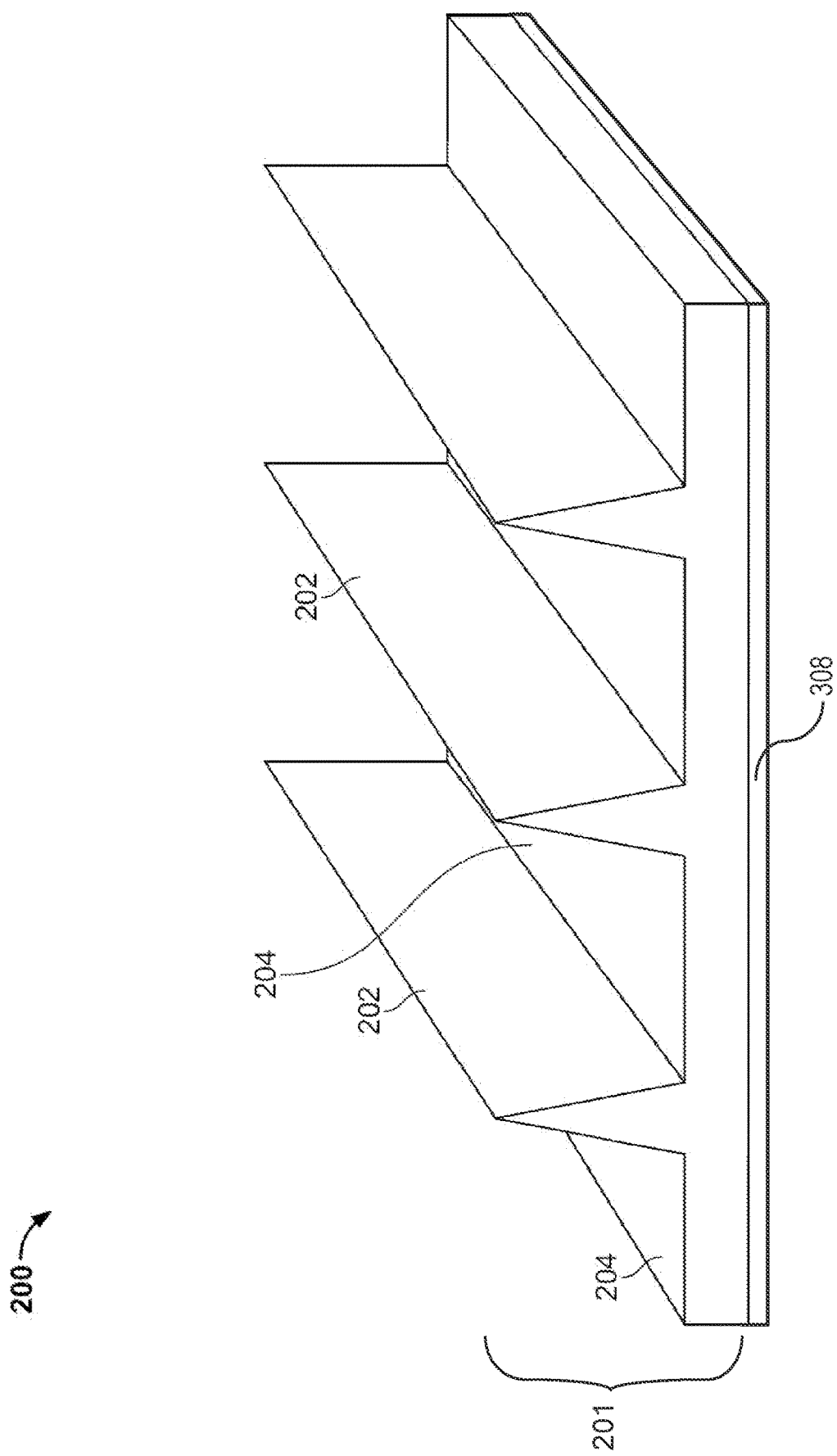
FIG. 2 is an example riblet microstructure from an external surface of the example aircraft of FIG. 1 on which the examples disclosed herein may be implemented.

FIG. 2 is the aforementioned example riblet applique (e.g., a fluorosilicone riblet structure) 200 of the external surface 120 of the example aircraft 100 of FIG. 1 on which the examples disclosed herein may be implemented. The riblet applique 200 includes a riblet structure 201 and a support layer 308, which is described in greater detail below in connection with FIGS. 3-5. The riblet structure 201 of the illustrated example is cast/molded and includes the ridges (e.g., wedges) 202, which are spaced apart from one another, and base surfaces (e.g., valleys, aircraft surfaces, etc.) 204 that space the ridges 202 apart from one another. In this example, the profiles of the ridges 202 are generally triangular, thereby defining ridges/wedges having generally triangular cross-sections. The ridges 202 may be spaced apart at distances of approximately 10-200 microns, for example. The riblet structure 201 is coupled to other layers to facilitate adhesion to external surfaces of the aircraft 100 and also to reduce long-term UV damage, as will be discussed in greater detail below in connection with FIGS. 3-5. While the example riblet structure 201 is cast/molded in this example, the riblet structure 201 may be formed by extruding, embossing, pressing, thermo-forming, machining, etc. In other examples, the base surfaces 204 may have ridges and/or other features/geometries that are smaller than the ridges 202. While the ridges 202 have a triangular cross-sectional profile, the ridges 202 may have any appropriate cross-sectional profile including, but not limited to, rectangular, oval-like, finned, etc.

In this example, the riblet applique 200 and/or the riblet structure 201 is a riblet of the aircraft 100 and is used to alter the aerodynamic characteristics of the aircraft 100 by reducing an overall drag of the aircraft 100, for example, and may be located on any external surface of the aircraft 100. The riblet applique 200 and/or the riblet structure 201 of the illustrated example is used to reduce aerodynamic drag by controlling the turbulent boundary layers and/or preventing cross-flows associated with a turbulent boundary layer in air near an external surface of the aircraft 100, as described above in connection with FIG. 1. In particular, the riblet structure 201 includes the ridges 202 and is installed on the external surface of the aircraft 100 as the riblet applique 200. Further, the ridges 202 are aligned with a desired direction of airflow. This alignment allows the ridges 202 to act as small fences or guides that disrupt and reduce lateral airflow motions near the external surface to enhance in-line turbulent airflow and reduce skin friction of the external surface, thereby reducing overall drag of the aircraft 100. In this example, the riblet applique 200 is applied to the aircraft 100 during manufacture of or after the aircraft 100 is manufactured. In some other examples, the riblet applique 200 is not attached or installed on the external surface during or after manufacturing of the aircraft 100 but, rather, is integral with the external surface. For example, the riblet applique 200 and/or the riblet structure 201 may be pre-formed or embedded into or on the external surface (e.g., machined or molded/cast onto a skin surface, built into a composite cured part, robotically placed, etc.) instead of being coupled (e.g., mechanically adhered) to the external surface. While the example riblet applique 200 and/or the riblet structure 201 is shown as having triangular ridges 202, the ridges 202 may be any other appropriate shape including round, rectangular, etc.

Figure 3:
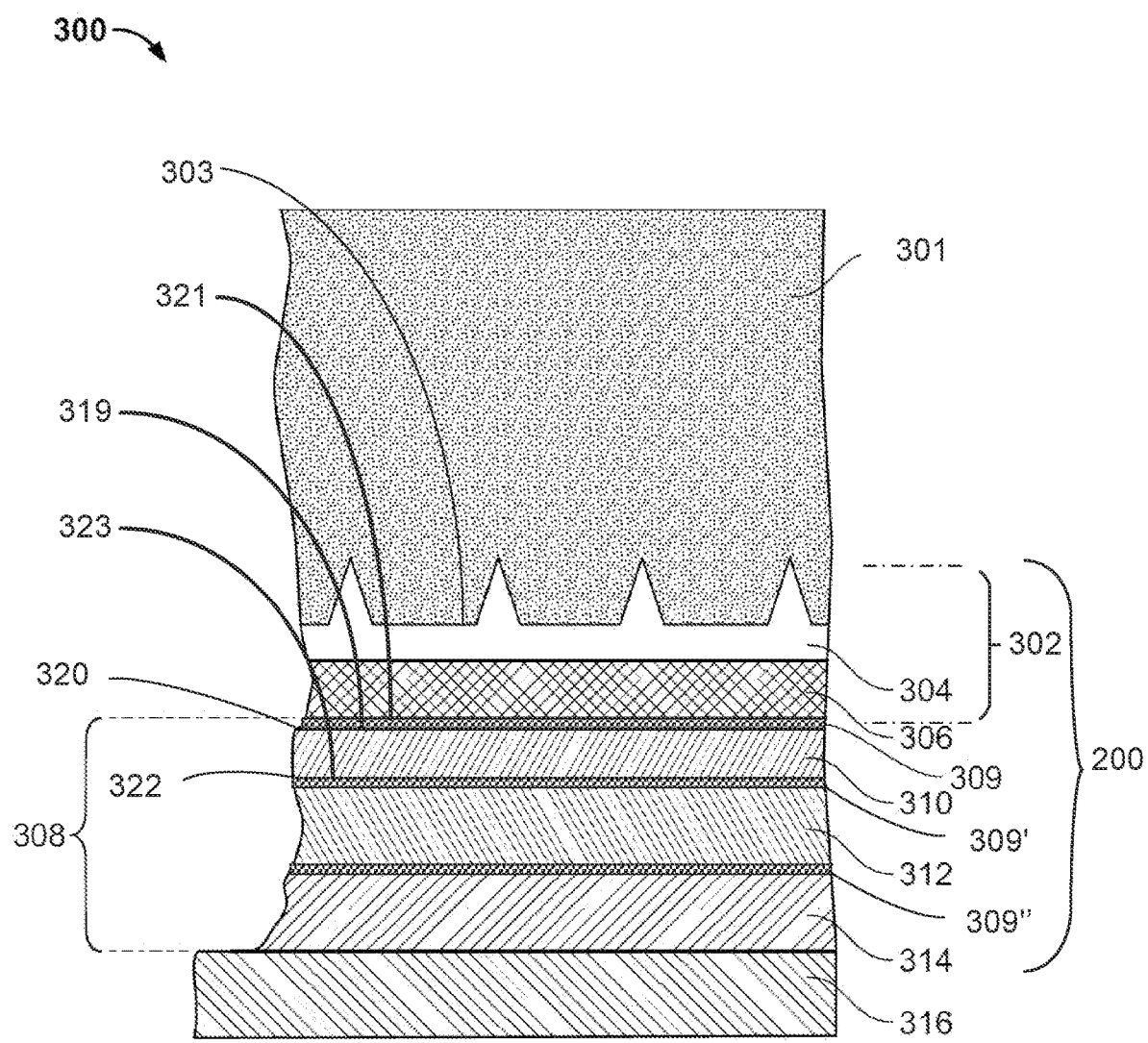
FIG. 3 is a cross-sectional view of an example layered riblet construction in accordance with the teachings of this disclosure.

FIG. 3 is a detailed cross-sectional view of an example layered (e.g., multilayered) riblet construction (e.g., a riblet applique, a riblet assembly, a riblet applique structure, a riblet, a layered riblet construction, etc.) 300 in accordance with the teachings of this disclosure. In the view of FIG. 3, the riblet construction 300 is shown prior to being assembled and/or adhered to at least one external surface of the aircraft 100. As can also be seen in FIG. 3, the riblet construction 300 of the illustrated example has multiple layers including a masking (e.g., an adhesive layer, a protective interface portion) 301, and a riblet elastomer 302 that can define the example riblet applique 200 and/or the riblet structure 201 of FIG. 2. In some examples, a polymer coating 303 is implemented between masking 301 and the riblet elastomer 302. The example riblet elastomer 302 includes a first fluorosilicone layer (e.g., a riblet tip structure, a clear riblet tip structure, etc.) 304, which defines a pattern of riblet tips/wedges and valleys, and may be transparent or opaque/colored, and a second fluorosilicone layer 306, which is a color layer in this example, but may be transparent in other examples. In some examples, when the first fluorosilicone layer 304 is opaque or colored, second fluorosilicone layer 306 may not be implemented. The example riblet construction 300 further includes the aforementioned support layer (also known as a base applique) 308. The support layer 308 of the illustrated example includes a polymer film 310 (e.g., a UV stable polyethylene terephthalate (PET) film, a UV opaque polymer film, etc.), a polymer sub-layer 312, which is also a thermoplastic material in this example, and a pressure sensitive adhesive sub-layer 314.

In this example, the polymer film 310 is implemented as a vacuum-plasma-treated polymer film, and includes a first surface (e.g., an upper surface, a surface adjacent or proximate the riblet elastomer 302) 320 and a second surface (e.g., a lower surface, a surface adjacent or proximate the polymer sub-layer 312) 322. Moreover, the polymer film 310 includes UV stable material that is highly resistant to damage from UV rays (e.g., from sunlight). For example, the polymer film 310 can be implemented as a UV stable PET or a UV stable Kapton material. However, any appropriate material can be implemented instead.

According to the illustrated example, the first surface 320 includes a riblet elastomer adhesion promoter 319 that is applied to facilitate adhesion of the riblet elastomer 302 to the support layer 308. In some examples, the riblet elastomer adhesion promoter facilitates casting (e.g., direct casting) of the first fluorosilicone layer 304 and/or the second fluorosilicone layer 306 onto the support layer 308. Further, the example first surface 320 is processed by a vacuum plasma treatment and growth of a relatively thin (e.g., tens of nanometers thin) metal oxide (e.g., a metal oxide layer, $SiO_2$, $Al_2O_3$, etc.) 321 thereon. In this example, the vacuum plasma process utilizes an ionized gas that flows between power and ground electrodes to enable and/or facilitate growth of the metal oxide. However, any appropriate plasma treatment process can be implemented instead. According to the illustrated example, the second surface 322 of the polymer film 310 includes a thermoplastic film adhesion promoter, which can be utilized for direct thermal lamination of the polymer film 310 to the polymer sub-layer 312. For example, the polymer sub-layer 312 can be implemented as a thermoplastic elastomer. Additionally or alternatively, the second surface 322 includes a polyurethane laminating adhesive promoter 323 (e.g., for "wet" bonding and/or lamination of the polymer film 310 to the polymer sub-layer 312). In some examples, the polymer film 310 and/or the polymer sub-layer 312 are treated for ink adhesion and/or plasma treated.

In some examples, at least one adhesive layer 309 is implemented between the polymer film 310 and the polymer sub-layer 312. An adhesive layer 309' can also be implemented between the second fluorosilicone layer 306 and the polymer film 310. Additionally or alternatively, an adhesive layer 309" is implemented between the polymer sub-layer 312 and the pressure sensitive adhesive sub-layer 314. The example adhesive layers 309, 309', 309" can be an aliphatic adhesive (e.g., aliphatic urethane, etc.), or any other appropriate type of adhesive.

In this example, the first and second fluorosilicone layers 304, 306 are different materials (e.g., different fluorosilicone layers). However, in other examples, the first and second fluorosilicone layers 304, 306 may be composed of the same material. In some such examples, the first and second fluorosilicone layers 304, 306 are integral (e.g., define a single and contiguous fluorosilicone layer) and/or only the first fluorosilicone layer 304 is implemented. In particular, the first and second fluorosilicone layers 304, 306 can be molded and/or extruded as a single component and/or layer.

While the first and second fluorosilicone layers 304, 306 of the illustrated example are fluorosilicone material(s), in other examples, the first and second fluorosilicone layers 304, 306 may include any high elongation elastomer, such as epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, or other hybrid polymers that include polyhedral oligomeric silsesquioxane, etc. However, any other appropriate material can be implemented instead.

To couple the riblet construction 300 to an aircraft and/or vehicle surface, the riblet construction 300 also includes a removable liner 316, which is removed to expose the pressure sensitive adhesive sub-layer 314. Further, while the masking 301 of the illustrated example is used to protect the riblet construction 300 and/or the first fluorosilicone layer 304 (e.g., riblet tips of the first fluorosilicone layer 304) during manufacturing, shipping and/or storage, the masking 301 is removed upon installation of the riblet construction 300 (e.g., during installation of the riblet construction 300 to a surface of an aircraft). The masking 301 can be an embossed polyethylene material, for example.

In this example, the masking 301 is implemented in and/or provided from a single-piece continuous roll web tool. In some examples, the masking 301 is rolled (e.g., via a rolling process) onto the first fluorosilicone layer 304 and/or the second fluorosilicone layer 306 to act as a protective installation surface with a relatively high lubricity, thereby enabling relatively smooth pressure across a surface of the first fluorosilicone layer 304 and/or the second fluorosilicone layer 306 when manual tools (e.g., squeegees) are used on and/or applied to the riblet construction 300 and/or any component(s) thereof. In this example, the aforementioned lubricity of the first fluorosilicone layer 304 prevents damage of the riblet construction 300 when the masking 301 is applied or removed from the riblet construction 300.

An example method 400 begins as the example riblet construction 300 is to be produced and integrated onto a vehicle. In particular, the riblet construction 300 is to be produced for integration onto an aircraft to decrease a drag coefficient of the aircraft and, in turn, reduce fuel consumption of the aircraft, thereby enabling potential reductions of operating expenses pertaining to the aircraft. However, the riblet construction 300 can be applied to any appropriate other type of vehicle.

At block 402, the riblet structure 201 is produced and/or defined. In this example, the riblet structure 201 is produced and then subsequently placed onto a surface of an aircraft, such as the example aircraft 100 shown in FIG. 1. In some other examples, the riblet structure 201 can be cast onto a skin surface. In some examples, the riblet structure 201 is cast onto the support layer 308 (e.g., by accomplishing blocks 404 and 406 described below simultaneously), the adhesive layer 309, and/or the polymer film 310. Additionally or alternatively, the riblet structure 201 is cast onto the polymer film 310 and/or an associated masking layer, and then coupled to either support layer 308 (e.g., by accomplishing blocks 404 and 406 simultaneously) or onto polymer film 310.

At block 403, the support layer 308 is produced and/or defined. As will be discussed in greater detail below in connection with FIG. 5, the support layer 308 is produced and/or defined by adding and/or coupling numerous layers. In an alternative example, the riblet structure 201 is produced (block 402) then incorporated into production of the support layer (block 403), thereby producing a final applique (e.g., completion of block 408 below).

At block 404, the riblet structure 201 is aligned to the support layer 308. For example, a first roll of the riblet structure 201 is aligned to a second roll of the support layer 308 so that the riblet structure 201 can be subsequently coupled to the support layer 308 as the first and second rolls are unrolled, for example.

At block 406, in some examples, the riblet structure 201 is coupled to the support layer 308 to define the riblet construction 300 and/or the riblet applique 200. In some such examples, the riblet construction 300 is coupled to the support layer 308 via the adhesive promoter 323, for example.

At block 408, in some examples, the riblet construction 300 is cured. In some such examples, the riblet construction 300 is cured in an oven (e.g., cured in an oven as the riblet construction 300 is being moved along a conveyor belt, or at ambient temperature after roll up of the multilayer riblet applique). Additionally or alternatively, the riblet elastomer 302 is cured with (e.g., concurrently with) the support layer 308.

At block 410, if a webtool embossed with the negative profile of the desired riblet shape was not used to create the riblet elastomer 302 and retained after casting the riblet elastomer 302, the protective masking 301 is applied to the riblet construction 300. In this example, the masking 301 is applied onto the riblet construction 300 with a continuous roll casting process. In some examples, the masking 301 is placed on a webtool, and embossed with the negative profile of the desired riblet shape, onto which the first fluorosilicone layer 304 is cast.

At block 412, the riblet applique 200 is applied to a vehicle, such as the aircraft 100 of FIG. 1. In this example, the riblet applique 200 is aligned relative to the vehicle so that the ridges 202 shown in FIG. 2 are generally aligned with (e.g., extend along) a direction of airflow over the vehicle.

At block 414, it is determined whether to repeat the process. If the process is to be repeated (block 414), control of the process returns to block 402. Otherwise, the process ends. The determination may be based on whether additional riblet structures are to be produced, whether additional riblets structures are to be provided to a vehicle and/or whether additional vehicles are to be applied with the riblet applique 200.

Figure 4:
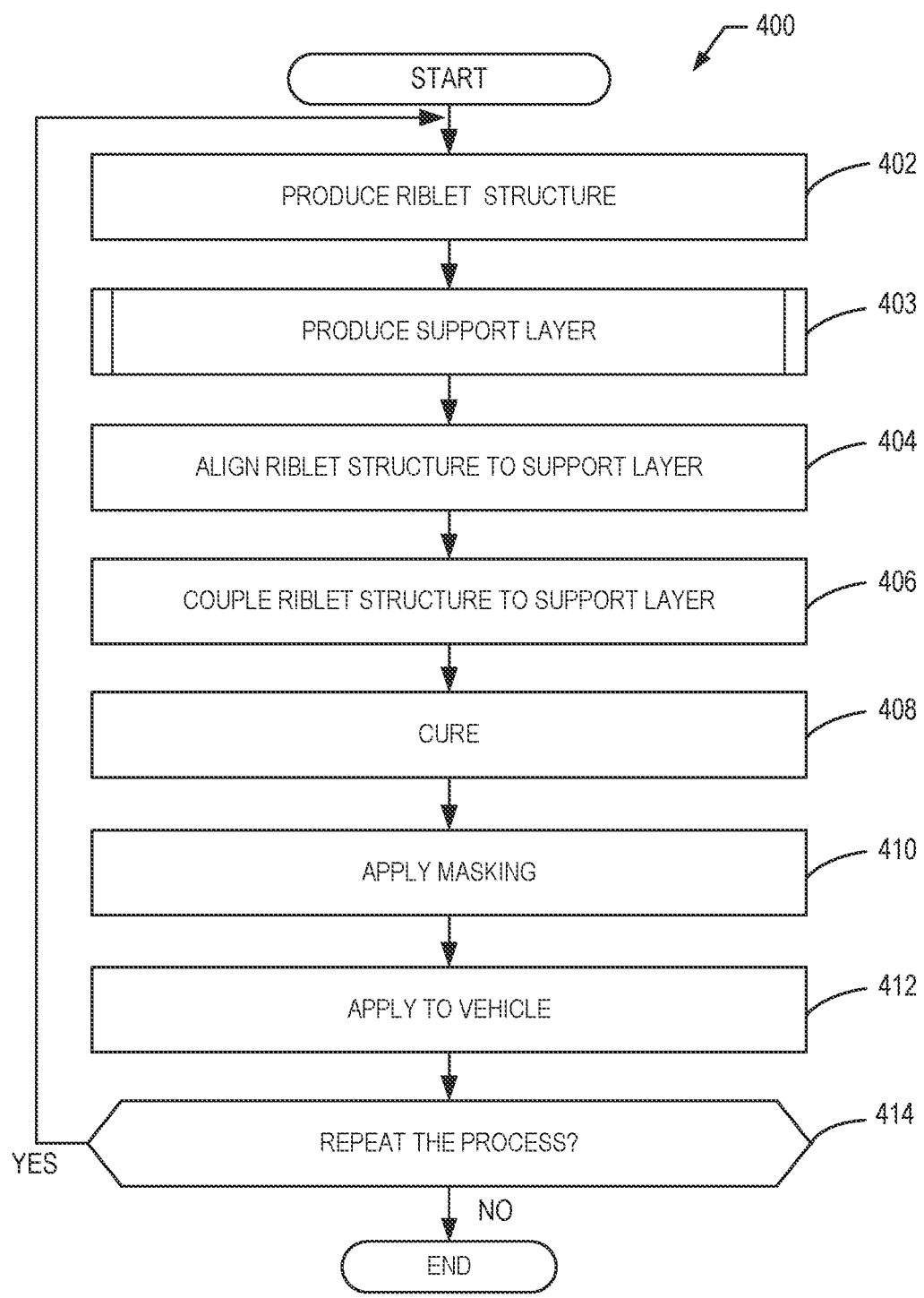
FIG. 4 is a flowchart representative of an example method that may be used to implement the examples disclosed herein.
Figure 5:
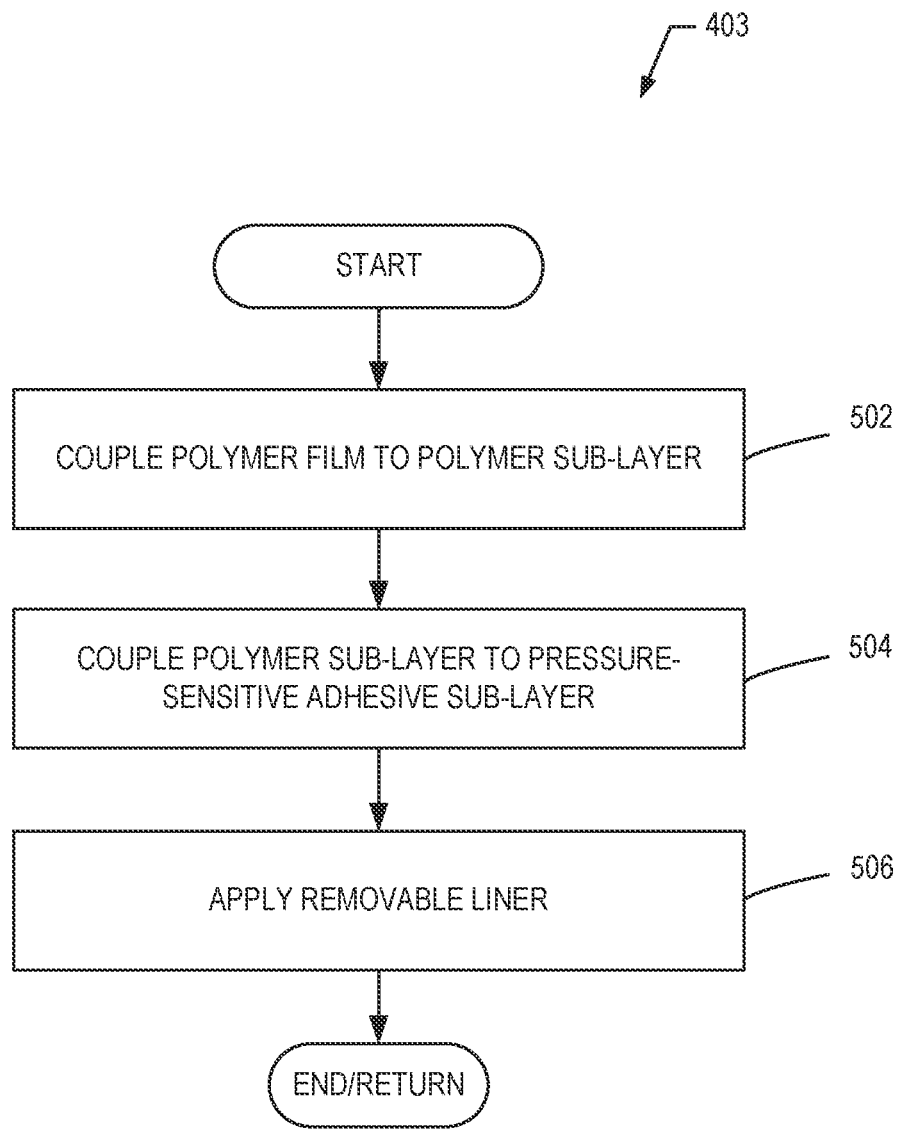
FIG. 5 is a flowchart representative of an example sub-routine of the example method of FIG. 4.

FIG. 5 is a flowchart representative of the example subroutine 403 of the example method 400 of FIG. 4. In this example, the support layer 308 is to be produced to provide UV resistance and structural support to the riblet applique 200 and/or the riblet construction 300.

At block 502, the polymer film 310 is coupled to the polymer sub-layer 312. In the illustrated example, the polymer film 310 is implemented as a vacuum-plasma-treated polymer film. In some examples, the polymer film 310 is coupled to the polymer sub-layer 312 via the aliphatic adhesive 309'.

At block 504, the polymer sub-layer 312 is coupled to the pressure-sensitive adhesive sub-layer 314. In some examples, the polymer sub-layer 312 is coupled to the pressure-sensitive adhesive sub-layer 314 with an aliphatic adhesive 309".

At block 506, in some other examples, the removable liner 316 is coupled to the adhesive sub-layer 314 and the process ends/returns. In this example, the adhesive sub-layer 314 is incorporated with the adhesive sub-layer 314. The removable liner 316 can be subsequently removed from the support layer 308 when the riblet construction 300 is applied to a vehicle, for example.

Further examples and combinations thereof include the following: Example 1 includes a riblet applique comprising a fluorosilicone riblet structure including riblet ridges and a base from which the riblet ridges extend, and a support layer proximate the fluorosilicone riblet structure, the support layer including a vacuum-plasma-treated polymer film having a first surface and a second surface opposite the first surface, and a polymer sub-layer proximate the second surface of the polymer film.

Example 2 includes the riblet applique as defined in example 1, wherein the first surface includes an elastomer adhesion promoter.

Example 3 includes the riblet applique as defined in any of examples 1 or 2, further including an aliphatic adhesive between the vacuum-plasma-treated polymer film and the fluorosilicone riblet structure.

Example 4 includes the riblet applique as defined in example 3, wherein the aliphatic adhesive is a first aliphatic adhesive, and further including a second aliphatic adhesive between the polymer sub-layer and a pressure sensitive adhesive sub-layer of the support layer.

Example 5 includes the riblet applique as defined in any of examples 1 to 4, wherein the vacuum-plasma-treated polymer film includes a metal oxide layer.

Example 6 includes the riblet applique as defined in any of examples 1 to 5, further including a polyurethane laminating adhesive promoter positioned at or proximate the second surface.

Example 7 includes the riblet applique as defined in any of examples 1 to 6, further including a masking adjacent the fluorosilicone riblet structure, the masking including an embossed polyethylene.

Example 8 includes the riblet applique as defined in example 7, further including a polymer coating between the masking and the fluorosilicone riblet structure.

Example 9 includes the riblet applique as defined in any of examples 1 to 8, wherein the vacuum-plasma-treated polymer film includes an ultraviolet (UV) stable material.

Example 10 includes the riblet applique as defined in example 9, wherein the vacuum-plasma-treated polymer film includes polyethylene terephthalate.

Example 11 includes the riblet applique as defined in any of examples 1 to 10, wherein the fluorosilicone riblet structure includes a first fluorosilicone layer and a second fluorosilicone layer, the first and second fluorosilicone layers composed of different fluorosilicone materials.

Example 12 includes the riblet applique as defined in any of examples 1 to 11, wherein the fluorosilicone riblet structure is cast to the vacuum-plasma-treated polymer film.

Example 13 includes a method of producing a riblet applique, the method comprising aligning a fluorosilicone riblet structure to a support layer, the fluorosilicone riblet structure including riblet ridges and a base from which the riblet ridges extend, the support layer including a vacuum-plasma-treated polymer film having a first surface and a second surface opposite the first surface, and a polymer sub-layer proximate the second surface of the polymer film, and coupling the fluorosilicone riblet structure to the support layer at the first surface.

Example 14 includes the method as defined in example 13, further including coupling the vacuum-plasma-treated polymer film to the polymer sub-layer.

Example 15 includes the method as defined in example 14, further including applying an elastomer adhesion promoter to the support layer prior to coupling the elastomeric sub-layer to the support layer.

Example 16 includes the method as defined in example 15, further including coupling the support layer to the elastomeric sub-layer via thermal lamination.

Example 17 includes the method as defined in any of examples 14 to 16, wherein the coupling the fluorosilicone riblet structure to the support layer includes applying an aliphatic adhesive to at least one of the fluorosilicone riblet structure or the support layer.

Example 18 includes the method as defined in any of examples 13 to 17, further including curing the fluorosilicone riblet structure with the support layer.

Example 19 includes the method as defined in example 18, wherein curing the fluorosilicone riblet structure to the support layer is performed via an oven.

Example 20 includes the method as defined in example 18, wherein curing the fluorosilicone riblet structure to the support layer is performed at ambient temperature on a roll.

Example 21 includes a method of affecting aerodynamic properties of an aircraft, comprising modifying aerodynamic properties of a surface of the aircraft by applying a riblet applique to the aerodynamic surface of the aircraft, the riblet applique including a fluorosilicone riblet structure including riblet ridges and a base from which the riblet ridges extend, and a support layer proximate the fluorosilicone riblet structure, the support layer including a vacuum-plasma-treated polymer film having a first surface and a second surface opposite the first surface, and a polymer sub-layer proximate the second surface of the polymer film.

Example 22 includes the method as defined in example 21, wherein the aerodynamic surface includes a surface of a wing, or a horizontal stabilizer.

Example 23 includes the method as defined in example 21, wherein the riblet structures are aligned relative to a direction of travel of the aircraft so that aerodynamic drag of the aircraft is reduced by preventing cross-flows associated with a turbulent boundary layer proximate the aerodynamic surface.

Example 24 includes the method as defined in example 21, wherein applying the riblet applique to the aerodynamic surface includes aligning the riblet ridges to a direction of airflow over the aerodynamic surface.

Example 25 includes a support layer for use with a riblet applique, the support layer comprising a vacuum-plasma-treated polymer film having a first surface and a second surface opposite the first surface, the first surface to be coupled to a riblet structure including riblet ridges and a base from which the riblet ridges extend, and a polymer sub-layer coupled to the second surface of the polymer film, the polymer sub-layer to be coupled to an adhesive for coupling the riblet applique to an external surface of a vehicle.

Example 26 includes the support layer as defined in example 25, wherein the polymer film is coupled to the polymer sub-layer via an aliphatic adhesive.

From the foregoing, it will be appreciated that example systems, methods, apparatus, and articles of manufacture have been disclosed that enable cost-effective and easy to produce riblet structures. Examples disclosed herein enable a robust layering of multilayer riblet applique that is highly resistant to separation (e.g., internal layer separation, delamination, etc.), as well as UV damage. Some examples disclosed herein implement adhesives with aliphatic urethane to exploit a notably higher UV resistance of aliphatic chemistry. For examples that implement this adhesive between multiple or all layers, significant increases in UV resistance can be experienced. By replacing UV-screening typically accomplished by foil and reducing and/or eliminating use of polyether ether ketone (PEEK) film, examples disclosed herein can utilize a single polymer layer, for example, that exhibits both UV resistance to damage and, importantly, UV opacity to minimize transmission of UV into laminate layers below.

Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A riblet applique comprising:
a fluorosilicone riblet structure including riblet ridges and a base from which the riblet ridges extend; and
a support layer proximate the fluorosilicone riblet structure, the support layer including:
a vacuum-plasma-treated polymer film having a first surface and a second surface opposite the first surface,
a polymer sub-layer proximate the second surface of the polymer film; and
an aliphatic adhesive between the vacuum-plasma-treated polymer film and the fluorosilicone riblet structure.

2. The riblet applique as defined in claim 1, wherein the aliphatic adhesive is a first aliphatic adhesive, and further including a second aliphatic adhesive between the polymer sub-layer and a pressure sensitive adhesive sub-layer of the support layer.

3. The riblet applique as defined in claim 1, wherein the vacuum-plasma-treated polymer film includes a metal oxide layer.

4. The riblet applique as defined in claim 3, wherein the metal oxide layer includes at least one of silicon dioxide or aluminum oxide.

5. The riblet applique as defined in claim 1, further including a polyurethane laminating adhesive promoter positioned at or proximate the second surface.

6. The riblet applique as defined in claim 1, wherein the vacuum-plasma-treated polymer film includes an ultraviolet (UV) stable material.

7. The riblet applique as defined in claim 6, wherein the vacuum-plasma-treated polymer film includes polyethylene terephthalate.

8. The riblet applique as defined in claim 1, wherein the fluorosilicone riblet structure includes a first fluorosilicone layer and a second fluorosilicone layer, the first and second fluorosilicone layers composed of different fluorosilicone materials.

9. The riblet applique as defined in claim 1, wherein the first surface includes an elastomer adhesion promoter.

10. A riblet applique comprising:
a fluorosilicone riblet structure including riblet ridges and a base from which the riblet ridges extend; and
a support layer proximate the fluorosilicone riblet structure, the support layer including:
a vacuum-plasma-treated polymer film having a first surface and a second surface opposite the first surface,
a polymer sub-layer proximate the second surface of the polymer film, and
a masking adjacent the fluorosilicone riblet structure, the masking including an embossed polyethylene.

11. The riblet applique as defined in claim 10, further including a polymer coating between the masking and the fluorosilicone riblet structure.

12. A method of producing a riblet applique, the method comprising:
aligning a fluorosilicone riblet structure to a support layer, the fluorosilicone riblet structure including riblet ridges and a base from which the riblet ridges extend, the support layer including:
a vacuum-plasma-treated polymer film having a first surface and a second surface opposite the first surface,
a polymer sub-layer proximate the second surface of the polymer film, and
an aliphatic adhesive between the vacuum-plasma-treated polymer film and the fluorosilicone riblet structure; and
coupling the fluorosilicone riblet structure to the support layer at the first surface.

13. The method as defined in claim 12, further including coupling the vacuum-plasma-treated polymer film to the polymer sub-layer.

14. The method as defined in claim 13, further including applying an elastomer adhesion promoter to the support layer prior to coupling the polymer sub-layer to the support layer.

15. The method as defined in claim 14, further including coupling the support layer to the polymer sub-layer via thermal lamination.

16. The method as defined in claim 13, wherein the coupling the fluorosilicone riblet structure to the support layer includes applying the aliphatic adhesive to at least one of the fluorosilicone riblet structure or the support layer.

17. The method as defined in claim 12, wherein the first surface includes an elastomer adhesion promoter.

18. A method of affecting aerodynamic properties of an aircraft, comprising:
   modifying aerodynamic properties of an aerodynamic surface of the aircraft by applying a riblet applique to the aerodynamic surface of the aircraft, the riblet applique including:
      a fluorosilicone riblet structure including riblet ridges and a base from which the riblet ridges extend; and
      a support layer proximate the fluorosilicone riblet structure, the support layer including:
         a vacuum-plasma-treated polymer film having a first surface and a second surface opposite the first surface,
         a polymer sub-layer proximate the second surface of the polymer film, and
         an aliphatic adhesive between the vacuum-plasma-treated polymer film and the fluorosilicone riblet structure.

19. The method as defined in claim 18, wherein the aerodynamic surface includes a surface of a wing, or a horizontal stabilizer.

20. The method as defined in claim 18, wherein the riblet structures are aligned relative to a direction of travel of the aircraft so that aerodynamic drag of the aircraft is reduced by preventing cross-flows associated with a turbulent boundary layer proximate the aerodynamic surface.

21. The method as defined in claim 18, wherein applying the riblet applique to the aerodynamic surface includes aligning the riblet ridges to a direction of airflow over the aerodynamic surface.

22. The method as defined in claim 18, wherein the first surface includes an elastomer adhesion promoter.

* * * * *